H. L. HARDING.
RESILIENT TIRE FOR VEHICLE WHEELS.
APPLICATION FILED APR. 10, 1918.
1,294,796.
Patented Feb. 18, 1919.
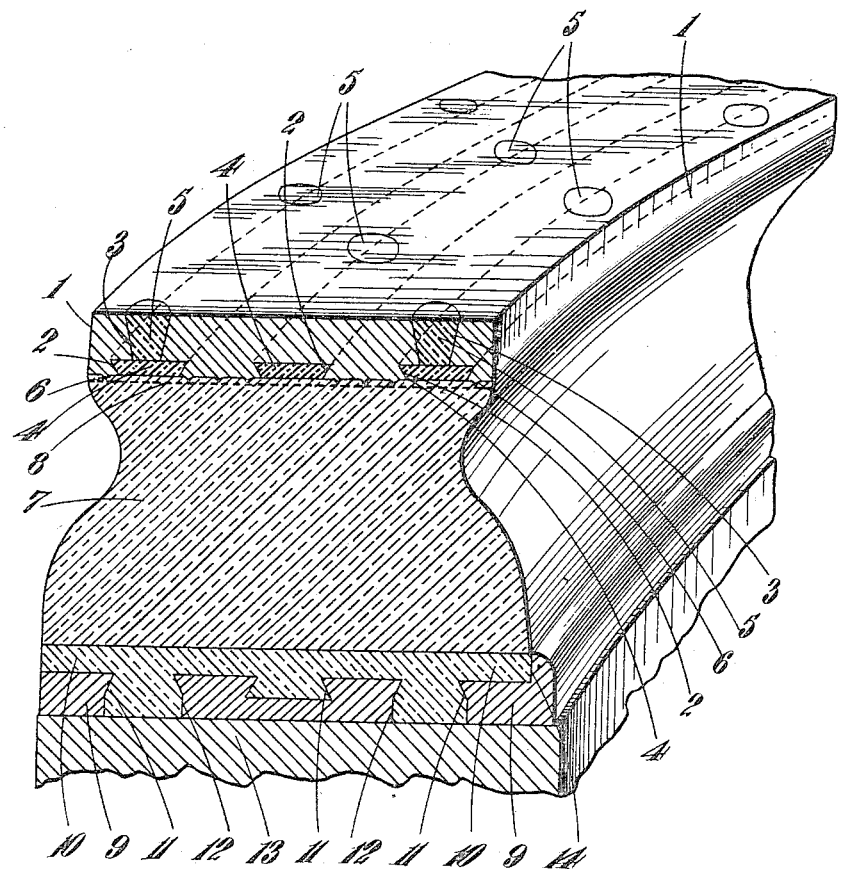
WITNESSES

UNITED STATES PATENT OFFICE.

HENRY LEONARD HARDING, OF LOUGHTON, ENGLAND.

RESILIENT TIRE FOR VEHICLE-WHEELS.

1,294,796.  Specification of Letters Patent.  Patented Feb. 18, 1919.

Application filed April 10, 1918. Serial No. 227,665.

*To all whom it may concern:*

Be it known that I, HENRY LEONARD HARDING, a subject of the King of Great Britain, residing at Loughton, in the county of Essex, England, have invented a new and useful Improvement Relating to Resilient Tires for Vehicle-Wheels, of which the following is a specification.

This invention relates to elastic or resilient tires for vehicle wheels and consists essentially in providing an improved bearing surface or tread for such tires the chief objects being to insure great adhesion between the parts constituting the tire to prevent oxidation or rusting and to obtain a practically homogeneous mass whereby the structure is rendered strong and durable and not liable to deterioration or dislocation.

The invention comprises a ring or band of metal such as good flexible steel which constitutes the tread of the tire and which is formed or provided on the inner face with longitudinal or circumferential grooves of dovetail formation. Holes or perforations are made in the grooves at suitable intervals the holes penetrating to the outer face of the ring or band. The holes or perforations are countersunk and of tapered form. The inner surface of the ring or band is also roughened preferably by tearing the metal while machining the said surface the latter thereby presenting the appearance of a file. The surfaces of the ring or band are served or plated with an alloy of copper, zinc and antimony for the purpose of preserving the same from oxidation or rusting. The grooves in the ring or band are furnished with bands or strips of rubber and the said ring or band so prepared is forced into position on the periphery of the tire in any suitable manner and the holes or perforations filled with rubber plugs. The structure is then subjected to vulcanization in a mold the pressure on the latter being gradually increased while cooling after vulcanization.

In order that the invention may be readily understood and carried into effect same will now be more fully described with reference to the accompanying drawing in which is represented in transverse section a portion of a solid rubber or resilient tire having the present improvements applied thereto.

The ring or band 1 which may be of flexible steel is formed as regards the inner surface with dovetail shape grooves 2 which extend wholly around the circumference the grooves penetrating a suitable distance into the metal of the ring or band. At suitable distances along the grooves 2 holes or perforations 3 are formed which pierce the metal from the bottom or floor of the grooves to the outer surface of the ring or band 1 and are of taper formation as shown. The grooves 2 and holes 3 are adapted to receive respectively strips or bands of rubber 4 and rubber plugs or keys 5. The inner surface of the ring or band is machined and subjected to a tearing action so as to produce a roughened surface 6 similar in appearance to that of an ordinary file the object being to obtain increased adhesion for the parts in contact therewith.

The ring or band 1 before having the rubber strips or bands 4 or the plugs or keys 5 applied thereto is treated for the purpose of preventing the surface being affected by the action of oxidation or rusting. To this end the said ring or band is served or coated with a plating of an alloy composed of copper zinc and antimony in suitable proportions.

In assembling the parts comprising the tire, the ring or band 1, prepared by having formed therein the grooves 2 and holes or perforations 3 the surfaces treated with the non-oxidizable plating and the inner surface machined and roughened as indicated at 6 is furnished as regards the grooves 2 with the strips or bands 4 of rubber and the ring 1 forced upon the periphery of the tire 7 the said periphery having been previously prepared for the reception of the metal ring or band 1 and a layer of strong cloth applied thereto. The method of application of the canvas or cloth to the surface of the rubber will be readily understood by those acquainted with the art and the particular method employed may be that which is best suited to prevailing circumstances or requirements. Having applied the ring or band 1 to the periphery of the rubber tire 7 the holes or perforations are now filled with rubber plugs or keys 5 and the structure subjected to vulcanization in a mold. In order to render the structure a practically homogeneous whole when finished pressure on the mold is applied with gradually increasing effect while cooling after the process of vulcanization has been effected.

In the above description it has been assumed that the tire 7 is of solid formation and applied to the wheel felly in any desired manner. A preferred method of application is by means of a metal band 9 and an intermediate ring 10 of good tough ebonite the metal band being formed with circumferential grooves 11 and perforations 12 and fitting upon the beveled surface of the felly 13 of the wheel.

The metal band 1 is secured to the rubber tire 7 by shrinking or partly curing the rubber and then applying the band 1 thereon securing the same by the rubber plugs or keys and a second vulcanization. The band 9 is heated and thoroughly cleaned and after being allowed to cool is coated with an ebonite solution on the side which is to receive the rubber 7 the naphtha in the solution being allowed to evaporate. The inner portions of the tire is built up with the ebonite ring 10 to a depth corresponding with the outer edge of the flanged portion 14 of the band 9 and coated with a good tough rubber solution. The naphtha having been allowed to evaporate from the solution the tire 7 is built up to the thickness required to fit tightly and snugly in the band 1 when vulcanized and thoroughly set. Before applying the band 1 it is thoroughly cleaned and the surfaces thereof which are to be vulcanized to the rubber coated with ebonite solution from which the naphtha is allowed to evaporate. The tire 7 is vulcanized on the band 9 in a suitable mold, the vulcanization being sufficient to vulcanize the rubber only, and allowed to set thoroughly. The periphery of the tire 7 having been cleaned and coated with rubber solution and the naphtha allowed to evaporate from the latter the canvas or cloth fabric 8 impregnated and coated with rubber solution is applied. The band 1 having the strips or bands 4 applied thereto is then forced on the tire 7 and the plugs or keys 5 inserted and forced into the holes 3. A temporary wrapping of strong cloth is then applied to the periphery and the whole is placed in a suitable mold and finally vulcanized the pressure on the mold being gradually increased during the cooling after vulcanization. By these means a very strong and durable structure is obtained the tire 7 with the canvas or cloth 8 the strips or bands 4 plugs or keys 5 and ebonite 10 being firmly united to the rings or bands 1 and 9 and constituting a homogeneous mass.

The metal band 9 may also be coated or plated with the above described non-oxidizable alloy. It is advantageous to coat or plate all metal surfaces which are designed to come into contact with either rubber or ebonite with the aforesaid or similar alloy.

When using the invention in connection with the outer cover of a pneumatic tire the *modus-operandi* in armoring the tread thereof is substantially similar to that already fully described with reference to the solid tire and further description is therefore unnecessary.

I claim:—

1. In an elastic or resilient tire for vehicle wheels the combination with a rubber cushion of an outer metal ring formed with circumferential dove tail shaped grooves in its inner surface and perforations at suitable distances in said grooves extending from the base of the latter to the outer surface of the said ring and rubber rings filling said grooves and rubber plugs filling said perforations.

2. In an elastic or resilient tire for vehicle wheels the combination with a rubber cushion of an outer metal ring formed with circumferential dovetail shaped grooves in its inner surface and tapered perforations at suitable distances in said grooves extending from the base of the latter to the outer surface of the said ring, roughened portions on the said inner surface of the said ring adapted to present a surface similar to that of an ordinary file and rubber rings filling said grooves and rubber plugs filling said perforations.

3. In an elastic or resilient tire for vehicle wheels the combination with a rubber cushion of an outer metal ring formed with circumferential dovetail shaped grooves in its inner surface and perforations at suitable distances in said grooves extending from the base of the latter to the outer surface of the said ring rubber rings filling said grooves and rubber plugs filling said perforations and a layer of canvas impregnated and coated with rubber solution between the adjacent surfaces of the said rubber cushion and the outer metal ring.

4. In an elastic or resilient tire for vehicle wheels the combination with a rubber cushion of an outer metal ring formed with circumferential dovetail shaped grooves in its inner surface and tapered perforations at suitable distances in said grooves extending from the base of the latter to the outer surface of the said ring roughened portions on the said inner surface of the said ring adapted to present a surface similar to that of an ordinary file rubber rings filling said grooves and rubber plugs filling said perforations and a layer of canvas impregnated and coated with rubber solution between the adjacent surfaces of the said rubber cushion and the outer metal ring.

5. An elastic or resilient tire for vehicle wheels in which a rubber cushion an outer metal ring formed with circumferential dove tail shaped grooves in its inner surface and perforations at suitable distances in said grooves extending from the base of the latter to the outer surface of the said ring rubber rings in said grooves and a layer of canvas impregnated and coated with rubber solution between the said rubber cushion and outer metal ring are constituted a homogeneous mass by vulcanizing the same in a mold.

6. An elastic or resilient tire for vehicle wheels in which a rubber cushion an outer metal ring formed with circumferential dove tail shaped grooves in its inner surface and tapered perforations at suitable distances in said grooves extending from the base of the latter to the outer surface of the said ring roughened portions on the said inner surface of said ring rubber rings in said grooves and rubber plugs in said perforations and a layer of canvas impregnated and coated with rubber solution between said cushion and outer metal ring are rendered a homogeneous mass by subjecting the same to vulcanization in a mold upon which a gradually increasing pressure is exerted during the cooling after vulcanization.

7. An elastic or resilient tire for vehicle wheels in which an outer ring having inner circumferential dovetail shaped grooves and perforations respectively filled with rubber rings and plugs a rubber cushion and an inner metal ring also having circumferential dovetail shaped grooves and perforations and a ring of ebonite intermediate the said inner metal ring and the rubber cushion are rendered a homogeneous mass by the method of vulcanization in which a gradually increased pressure is exerted upon the mold while the structure is cooling subsequent to the final vulcanization.

8. An elastic or resilient tire for vehicle wheels in which a rubber cushion an outer metal ring formed with circumferential dovetail shaped grooves in its inner surface tapered perforations at suitable distances in said grooves extending from the base of the latter to the outer surface of the said ring and roughened portions on the said inner surface of said ring rubber strips and plugs filling said grooves and perforations respectively an inner metal ring also formed with circumferential dovetail shaped grooves and perforations a layer of canvas impregnated and coated with rubber solution between the adjacent surfaces of the said rubber cushion and the outer metal ring and a ring of ebonite intermediate the said inner metal ring and the rubber cushion are all secured by vulcanization in accomplishing which a gradually increased pressure is exerted on the mold while the structure is cooling subsequent to final vulcanization.

HENRY LEONARD HARDING.